United States Patent
Widera et al.

(10) Patent No.: US 8,499,068 B2
(45) Date of Patent: Jul. 30, 2013

(54) METHOD FOR THE TRANSMISSION OF MEASURED DATA FROM A MEASURING COMPUTER TO A CONTROL COMPUTER IN A MEASURING SYSTEM

(75) Inventors: Ralf Widera, Griesheim (DE);
Cornelius Heidemann, Darmstadt (DE);
Joachim Mende, Griesheim (DE);
Heinrich Doerken, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 1783 days.

(21) Appl. No.: 10/507,179

(22) PCT Filed: Feb. 5, 2003

(86) PCT No.: PCT/DE03/00317
§ 371 (c)(1),
(2), (4) Date: Feb. 25, 2005

(87) PCT Pub. No.: WO03/077472
PCT Pub. Date: Sep. 18, 2003

(65) Prior Publication Data
US 2006/0059254 A1    Mar. 16, 2006

(30) Foreign Application Priority Data

Mar. 12, 2002  (DE) ................. 102 10 712

(51) Int. Cl.
*G06F 15/173* (2006.01)
*G06F 15/16* (2006.01)
*G06F 11/00* (2006.01)

(52) U.S. Cl.
USPC .................. 709/224; 709/219; 370/235

(58) Field of Classification Search
None
See application file for complete search history.

(56) References Cited

U.S. PATENT DOCUMENTS

| | | | |
|---|---|---|---|
| 5,561,825 A * | 10/1996 | Yamagami et al. | 710/58 |
| 5,649,107 A | 7/1997 | Kim et al. | |
| 5,751,964 A | 5/1998 | Ordanic et al. | 395/200.54 |
| 5,926,822 A * | 7/1999 | Garman | 715/503 |
| 6,108,782 A | 8/2000 | Fletcher et al. | 713/153 |
| 6,319,737 B1 * | 11/2001 | Putnam et al. | 438/17 |
| 6,459,682 B1 * | 10/2002 | Ellesson et al. | 370/235 |
| 6,661,797 B1 * | 12/2003 | Goel et al. | 370/395.21 |
| 6,675,209 B1 * | 1/2004 | Britt | 709/224 |
| 6,751,663 B1 * | 6/2004 | Farrell et al. | 709/224 |
| 2001/0021176 A1 | 9/2001 | Mimura et al. | |
| 2004/0024550 A1 | 2/2004 | Doerken et al. | 702/79 |

FOREIGN PATENT DOCUMENTS

| | | |
|---|---|---|
| DE | 10046240 | 3/2002 |
| DE | 10128927 | 1/2003 |
| EP | 1039691 | 9/2000 |
| EP | 1146687 | 10/2001 |
| WO | WO-98/47308 | 10/1998 |

OTHER PUBLICATIONS

S. Waldbusser: "RFC 1757—Remote Network Monitoring Management Information Base"; RFC—Request for Comments. Feb. 1, 1995; retrieved from the Internet < URL:http:/www.ietf.org/rfc/rfc1757.txt > ; pp. 1-91.

* cited by examiner

*Primary Examiner* — Wen-Tai Lin
(74) *Attorney, Agent, or Firm* — Leydig, Voit & Mayer, Ltd.

(57) ABSTRACT

A method for transmitting measured information from a measuring computer to a control computer of a measuring system, the control and measuring computers being interconnected via a telecommunications network, includes combining measured data into characteristic values having a lower volume than the measured data. The characteristic values are transmitted from the measuring computer to the control computer.

12 Claims, 2 Drawing Sheets

METHOD FOR THE TRANSMISSION OF MEASURED DATA FROM A MEASURING COMPUTER TO A CONTROL COMPUTER IN A MEASURING SYSTEM

CROSS-REFERENCE TO RELATED APPLICATIONS

This application is a U.S. National Stage Application under 35 U.S.C. §371 of PCT International Application No. PCT/DE03/00317, filed Feb. 5, 2003, which claims priority to German Patent Application No. DE 102 10 712.2, filed Mar. 12, 2002. Each of these applications is incorporated herein by reference as if set forth in its entirety.

The present invention relates to a method for transmitting measured data from a measuring computer to a control computer of a measuring system, the measuring computer and the control computer being interconnected via a telecommunications network.

BACKGROUND

A measuring system for measuring the Internet Protocol (IP) performance parameters, such as one-way delay, IP delay variations, and packet losses, in IP networks is known from non-prepublished German Patent Application DE 100 46 240.5. The subject matter of non-prepublished German Patent Application DE 101 28 927.8 is a method that allows time stamps to be generated in the measuring system even when access to a reference clock is blocked for a short time.

The measuring system underlying these patent applications is a distributed measuring system, i.e., the individual components of the measuring system are spatially distributed and interconnected via a telecommunications network. This measuring system includes at least two measuring computers, a database in which the measurement results and the configuration of the measuring system are stored, a control computer controlling the measuring computers for determining the measurement result, as well as various graphical user interfaces, in particular for configuring the measuring system and visualizing the obtained measurement results.

In order to carry out the measuring method, a unidirectional measurement path is established between at least two measuring computers. On this measurement path, measurement packets are sent from a first measuring computer to a second measuring computer with a configurable distribution in time.

In the process, the departure of the measurement packet from the first measuring computer is recorded; i.e., a first time stamp is generated. This first time stamp is transmitted to the second measuring computer together with the measurement packet and other data, such as sequence numbers. The second measuring computer records the arrival of the measurement packet and generates a second time stamp.

To allow the one-way delay resulting from the difference of the two time stamps to be determined with sufficient accuracy, the time stamps generated by the measuring computers need to be synchronized with sufficient accuracy. To this end, the time stamps may be generated using a satellite system, such as GPS (Global Positioning System), acting as a time source, or from local clocks that are synchronized via NTP (Network Time Protocol).

The measurement results are retrieved by the control computer from the second measuring computer as measured data and stored in a database, where they are made available for visualization. The measured data and the system status may optionally be displayed via an offline display or an online display. In this context, "offline display" means that the display of the measured data must be initiated manually via a browser while in the case of the online display, the display is automatically updated and displayed at a certain time interval. The above-mentioned graphical user interfaces are used for this purpose.

The configuration of the measuring system is also carried out using the aforementioned graphical user interface. To this end, the user enters information about the type and course of the measurement. The information entered is stored in the database; the control computer reads out this configuration data, configures the measuring computers accordingly, and starts or stops the measurement connections according to this data.

SUMMARY OF THE INVENTION

Depending on the expansion level and configuration of the measuring system, very large data volumes may be generated, resulting in the following problems:

a) Since the measuring system is spatially distributed, it is potentially necessary to transmit the measured data over the same network that is to be checked using measuring techniques, which, in turn, negatively affects the transmission quality on the measurement paths.

b) The transmission of the measured data may put such a load on the measuring computers that the measuring accuracy is impaired.

c) When storing all individual pieces of measured data in the database of a measuring system having a certain expansion level and configuration, the data volume that can be reasonably managed to maintain an overview of the quality assurance measures to be taken can easily be exceeded.

It is an object of the present invention to provide a method for transmitting measured data from a measuring computer to a control computer of a measuring system in such a manner that, first of all, the data volume is reduced and, secondly, all relevant information is nevertheless available to the user, while avoiding the above-mentioned disadvantages.

The present invention provides a method for transmitting measured information from a measuring computer to a control computer of a measuring system, the measuring computer and the control computer being interconnected via a telecommunications network. The method includes combining measured data into characteristic values having a lower volume than the measured data; and transmitting the characteristic values from the measuring computer to the control computer.

The present invention also provides a measuring system including a control computer and a measuring computer interconnected with the control computer via a telecommunications network. The measuring computer combining measured data into characteristic values having a lower volume than the measured data, and transmitting the characteristic values to the control computer.

The present invention includes the discovery that the volume of measured data can be reduced by aggregating measured data over a certain time interval.

Thus, in accordance with the present invention, in order to reduce the volume of measured data, this data is combined into characteristic values over a predetermined time interval and these characteristic values are transmitted from the measuring computer to the control computer instead of the measured data combined into characteristic values.

Basically there are different ways to reduce the data volume. However, common data compression methods have the following disadvantages:

a) Lossy data compression, such as for audio/video data, cannot be used for measurement results because after data compression, the measurement results are no longer complete and therefore lose their significance.
b) Lossless data compression does, in fact, reduce the data volume to be transmitted, but does not solve the problem of data storage and data evaluation when the data is decompressed for this purpose. Rather, this even increases the data evaluation effort because each time the data must first be decompressed.

According to the present invention, however, the data is combined in such a manner that all pieces of information necessary for later statistical evaluation are retained while still achieving a suitably determinable data reduction. Instead of the actual measured data or a compression of the measured data, in accordance with one embodiment of the present invention, measured data may be generated for a plurality of measurement parameters, the measured data being combined into characteristic values according to the respective measurement parameter. Thus, different characteristic values are acquired for each measurement parameter; the characteristic values in each case being determined for a time interval and then transmitted to the control computer.

Characteristic values that are preferably used are the minimum, the maximum, the mean value, the standard deviation and/or similar statistical values of the measured data over the time interval.

The time interval for combining measured data into characteristic values is determined especially as a function of the measuring task.

Measurement packets, in particular UDP measurement packets (User Datagram Protocol), are transmitted between two measuring computers. During the detection of measurement packet losses in a time interval, first of all, the sum of all packets lost is determined as a characteristic value and, secondly, the maximum of all successively occurring packet losses is determined as a characteristic value. In the second case, one speaks of so-called "bursts".

One embodiment of the present invention uses a measuring system that serves to determine unidirectional transmission characteristics and the results that can be derived therefrom. Here, one measuring computer acts as a sender and another measuring computer acts as a receiver; the other measuring computer combining the measured data into characteristic values and transmitting them to the control computer.

Preferably, the mean one-way delay, the maximum and the minimum one-way delay, the mean IP delay variation, the maximum IP delay variation, the packet loss and/or the throughput will be calculated from the measured data as characteristic values.

In the process, the characteristic values are associated with the time at which the measured data is combined into characteristic values.

It is a feature of the present invention that the decision-relevant information is retained in terms of content even with a reduced volume of measured data. This reduction allows many measurements to be processed in parallel, which is what actually enables a complex measuring system in a telecommunications network.

The early distributed aggregation allows measurement results to be transmitted from a measuring computer to a control computer in the same telecommunications network. Unlike the load that would have occurred if one result packet per measurement packet had been transmitted, the reduced volume of measured data places only a negligible load on the measuring system and the telecommunications network. At the same time, load is removed from the control computer during the processing, evaluation and visualization of the measured data from many measurements.

The reduction in the volume of measured data via the measuring computers allows the data to be stored in the database so that the data is also available for later evaluations. Without a suitable reduction in the volume of measured data, perhaps only real-time evaluation is possible, provided that the limited processing speed allows real-time evaluation at all in the case of many parallel measurements, since the large volumes of measured data generated cannot be stored. Due to the reduction to characteristic values, the measuring system allows long-term measurements with many parallel measurements.

BRIEF DESCRIPTION OF THE DRAWINGS

Further advantages, features and possible uses of the present invention for transmitting measured data from a measuring computer to a control computer of a measuring system will become apparent from the following description in conjunction with exemplary embodiments shown in the drawings.

DETAILED DESCRIPTION

Figure 1:
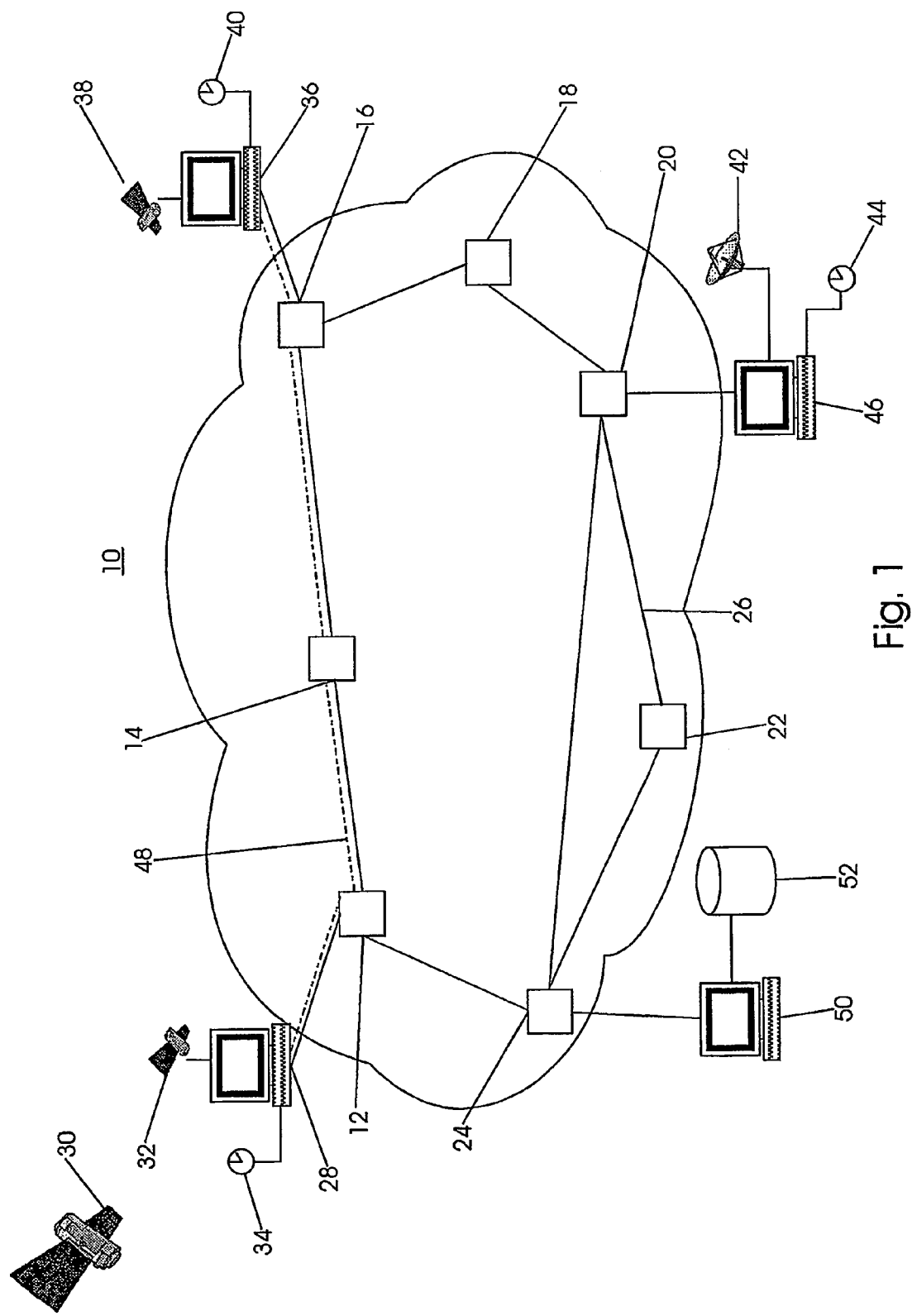
FIG. 1 is a schematic representation of a telecommunications network including a plurality of measuring computers having different time sources for carrying out the method according to the present invention.

FIG. 1 schematically shows a telecommunications network 10 including a plurality of switching devices 12 through 24 interconnected via trunk lines 26. Telecommunications network 10 is, for example, the Internet.

Switching exchange 12 is assigned a first measuring computer 28. To receive signals emitted by a satellite system (GPS) including a plurality of satellites 30, first measuring computer 28 has a GPS antenna 32 and a GPS map for processing the received signals. GPS antenna 32 and the GPS map together form the local GPS receiver of first measuring computer 28 required to receive the GPS signals.

A second measuring computer 36 connected to the switching device 16 also has a GPS antenna 38 and a local clock 40. The local GPS receiver of second measuring computer 36 required to receive the GPS signals is, in turn, made up of GPS antenna 38 and a GPS map, which is integrated in second measuring computer 36.

Corresponding peripheral devices, namely a GPS antenna 42 and a local clock 44, are associated with a third measuring computer 46 connected to switching device 20. Here too, a GPS map and GPS antenna 42 form a local GPS receiver of third measuring computer 46 required to receive the emitted GPS signals.

Measuring computers 28, 36 and 46 continuously receive UTC time (Universal Coordinated Time) via the local GPS receivers introduced earlier. For the sake of simplicity, the GPS receivers of measuring computers 28, 36, 46 are referred to as GPS clock, as mentioned above.

Trunk lines 26 from first measuring computer 28 via switching devices 12, 14 and 16 to second measuring computer 36 form a measurement path 48, which is shown in the drawing as a double dot-dashed line for the purpose of illustration.

A control computer 50 interacting with a database 52 is assigned to switching device 24. Control computer 50 is used to control measuring computers 28, 36.

To carry out the measurement, a measurement program for measuring the one-way delay is installed in each of measuring computers 28 and 36.

The goal of the measurement system is to determine the packet delay of a measurement packet from first measuring computer 28 via measurement path 48 to second measuring computer 36. Thus, the measurement connection is a unidirectional measurement connection, where separate measurement packets are sent from first measuring computer 28 to measuring computer 36.

The measurement of the one-way delay is carried out according to the following simplified scheme:

A measurement packet is sent from first measuring computer 28 to second measuring computer 36 via measurement path 48, i.e. via trunk line 26, switching exchange 12, switching exchange 14, and switching exchange 16.

In particular, the measurement packets are dispatched using the User Datagram Protocol (UDP). UDP is a connectionless Internet transport protocol based on IP. The measurement packets contain, inter alia, time stamps and sequence numbers.

Shortly before first measuring computer 28 sends the first bit of the measurement packet, the so-called "send time stamp" is read out/set. This value of the send time stamp, i.e., the sending time of the measurement packet, is transmitted to second measuring computer 36 together with the measurement packet. At second measuring computer 36, the arrival of the measurement packet is detected. In the process, a so-called "receive time stamp" is generated shortly after the last bit of the test packet is received at second measuring computer 36.

Figure 2:
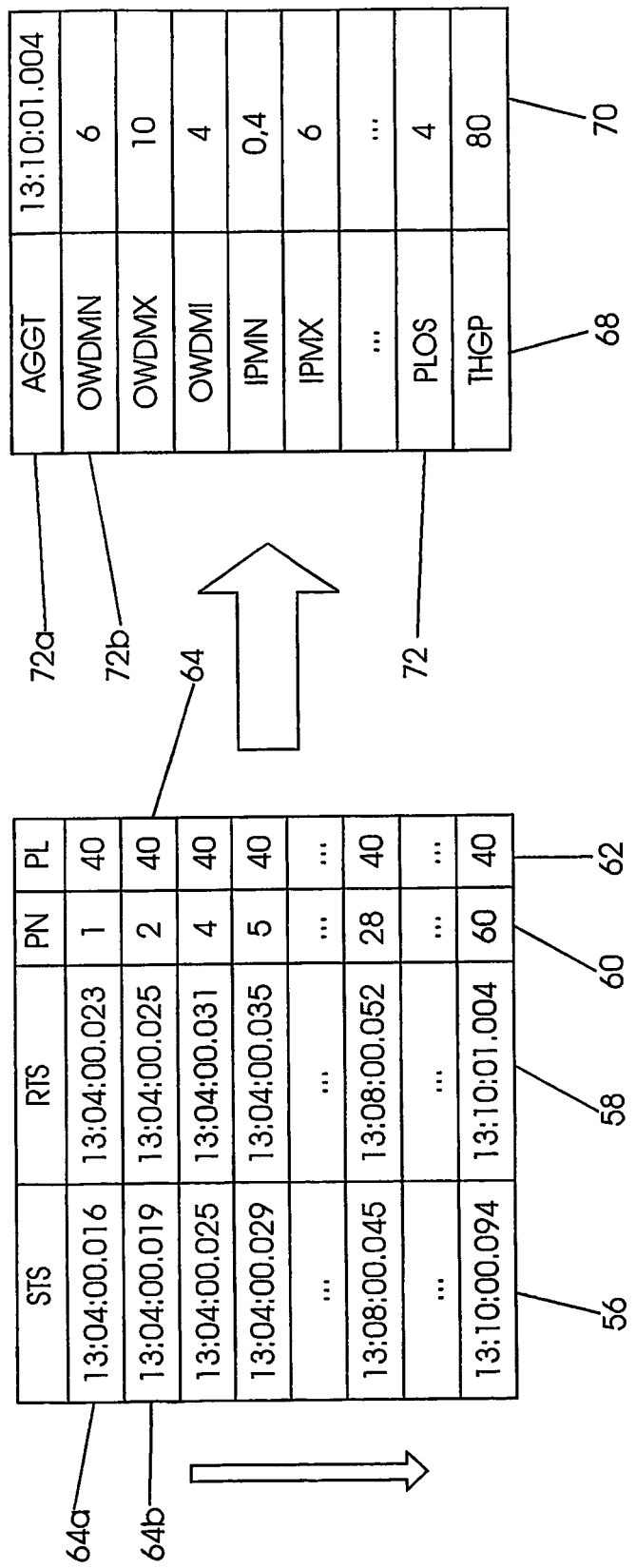
FIG. 2 schematically shows the combining of measured data into characteristic values in a time interval.

FIG. 2 schematically shows the process of combining the measured data into characteristic values. The measured data is listed in Table 54 on the left in FIG. 2. Table 54 of measured data is composed of four columns 56, 58, 60 and 62. Table 54 includes 56 rows 64, only a few of which are shown for the sake of clarity. A total of 60 measurement packets were dispatched, of which 4 were lost and evaluated as a packet loss. Table 54 corresponds to the data measured in a time interval which, in the present case, is about six minutes.

In first column 56, the send time stamps, i.e., the sending time of the measurement packet, are shown one below the other, from top to bottom. The receive time stamps at second measuring computer 36 are shown in second column 58, also in consecutive order from top to bottom. The respective numbers of the measurement packets are plotted consecutively from top to bottom in third column 60 of Table 54 of measured data. Fourth column 62 shows the length of the measurement packet. For example, second row 64a shows the send time stamp 13:04:00.016, the receive time stamp 13:04:00.023, the number of the measurement packet, namely 1, as well as the length of the measurement packet, namely 40.

The data of the second measurement packet follow in third row 64b, and so on. In the present example, a total of 56 measurement packets are contained in one time interval. Thus, 224 values are obtained. From these 224 values, 8 values are formed by classification into characteristic values; i.e., the characteristic values shown in Table 66 are formed by aggregation for this time interval.

Table 66 of characteristic values is composed of two columns 68 and 70. Table 66 includes nine rows 72; eight rows 72 being assigned to the characteristic values, and the aggregation time being entered in first row 72a. The aggregation time allows the calculated characteristic values to be associated with the original measured data. The type of the characteristic value is in each case specified in first column 68 while the second column lists the value of the respective characteristic value.

Second row 72b of Table 66 lists the mean one-way delay (OWDMN) in the time interval associated with the measured data of Table 54. The third row lists the maximum one-way delay (OWDMX), the fourth row shows the minimum one-way delay (OWDMI), the fifth row contains the mean IP delay variation (IPMN), the sixth row shows the maximum IP delay variation (IPMX), the seventh row contains further statistical data, such as the standard deviation, etc., the eighth row shows the packet losses (PLOS), and the ninth row lists the throughput (THGP) for the measured data shown in Table 54 for one time interval. This illustrates that, instead of the 224 values of Table 54, only eight values are transmitted from second measuring computer 36 to control computer 50 together with the aggregation time so that the volume of measured data is considerably reduced in a simple manner.

The present invention is characterized by a simple aggregation method that transmits all data required for monitoring the quality of a network to thereby obtain a quick overview of the quality situation in the network.

What is claimed is:

1. A method for transmitting measured information from a measuring computer to a control computer of a measuring system, the measuring computer and the control computer being interconnected via a telecommunications network, the method comprising:
transmitting a plurality of measurement packets to the measuring computer so as to provide measured data including a plurality of respective one-way delay measurements;
combining the measured data into an aggregation of characteristic values, wherein the aggregation has a lower volume than the measured data, and includes at least two ene of a mean one-way delay, a maximum one-way delay, a minimum one-way delay, a standard deviation of a one-way delay, a mean IP delay variation, a maximum IP delay variation, a standard deviation of an IP delay variation, a packet loss, and a packet throughput over a time interval;
associating the characteristic values with a time of the combining; and
transmitting the aggregation from the measuring computer to the control computer.

2. The method as recited in claim 1 wherein the telecommunications network includes at least one of an interne and an intranet.

3. The method as recited in claim 1 wherein the measured data includes a plurality of measurement parameters, and wherein the combining is performed according to the respective measurement parameters.

4. The method as recited in claim 1 further comprising determining the time interval as a function of a measuring method.

5. The method as recited in claim 1 wherein the measuring system includes a second measuring computer and wherein measurement packets are transmitted between measuring computer and the second measuring computer.

6. The method as recited in claim 5 wherein the measurement packets include User Datagram Protocol measurement packets.

7. The method as recited in claim 5 wherein the characteristic values include a sum of all packets lost and a maximum of all successively occurring packet losses, and further comprising determining the sum of all packets lost and the maximum of all successively occurring packet losses during a detection of measurement packet losses in a time interval.

8. The method as recited in claim 5 wherein the measured data includes unidirectional transmission characteristics.

9. The method as recited in claim 5 wherein the combining and transmitting are performed using the measuring computer, and wherein the measuring computer functions as a receiver and the second measuring computer functions as a sender.

10. A measuring system comprising:
 a control computer; and
 a measuring computer interconnected with the control computer via a telecommunications network, the measuring computer being configured to:
  transmit a plurality of measurement packets to the measuring computer so as to provide measured data including a plurality of respective one-way delay measurements;
  combine the measured data into an aggregation of characteristic values, wherein the aggregation has a lower volume than the measured data, and includes at least two one of a mean one-way delay, a maximum one-way delay, a minimum one-way delay, a standard deviation of a one-way delay, a mean IP delay variation, a maximum IP delay variation, a standard deviation of an IP delay variation, a packet loss, and a packet throughput over a time interval;
  associate the characteristic values with a time of the combining; and
  transmit the aggregation to the control computer.

11. The measuring system as recited in claim 10 wherein the telecommunications network includes at least one of an internet and an intranet.

12. The measuring system as recited in claim 10 wherein the measured data includes a plurality of measurement parameters, and wherein the combining is performed according to the respective measurement parameters.

* * * * *